(12) United States Patent
Zhang

(10) Patent No.: US 11,314,362 B2
(45) Date of Patent: Apr. 26, 2022

(54) TOUCH SUBSTRATE, TOUCH CONTROL DISPLAY APPARATUS, METHOD OF FABRICATING TOUCH SUBSTRATE

(71) Applicants: Hefei Xinsheng Optoelectronics Technology Co., Ltd., Anhui (CN); BOE Technology Group Co., Ltd., Beijing (CN)

(72) Inventor: Guiyu Zhang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 303 days.

(21) Appl. No.: 16/494,671

(22) PCT Filed: Oct. 26, 2018

(86) PCT No.: PCT/CN2018/112167
§ 371 (c)(1),
(2) Date: Sep. 16, 2019

(87) PCT Pub. No.: WO2020/082351
PCT Pub. Date: Apr. 30, 2020

(65) Prior Publication Data
US 2021/0333942 A1 Oct. 28, 2021

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0445* (2019.05);
(Continued)

(58) Field of Classification Search
CPC combination set(s) only.
See application file for complete search history.

(56) References Cited

U.S. PATENT DOCUMENTS

2015/0287381 A1* 10/2015 Kim ...................... G06F 3/0418
345/174
2017/0329455 A1* 11/2017 Zeng ..................... G06F 3/0412
(Continued)

FOREIGN PATENT DOCUMENTS

CN 106227386 A * 12/2016
CN 106462307 A 2/2017
(Continued)

OTHER PUBLICATIONS

International Search Report & Written Opinion dated Jul. 31, 2019, regarding PCT/CN2018/112167.

*Primary Examiner* — Deeprose Subedi
(74) *Attorney, Agent, or Firm* — Intellectual Valley Law, P.C.

(57) ABSTRACT

A touch substrate has a touch sensing area, and a peripheral area for bonding circuit parts. The touch substrate includes a first touch electrode layer including a plurality of first touch electrodes; a second touch electrode layer including a plurality of second touch electrodes; an insulating layer insulating the first touch electrode layer from the second touch electrode layer; a plurality of first touch signal lines extending across at least a portion of the touch sensing area into the peripheral area; and a plurality of vias extending through the insulating layer. The plurality of first touch signal lines are respectively connected to the plurality of first touch electrodes respectively through the plurality of vias. The plurality of first touch signal lines and the plurality of second touch electrodes are in a same layer.

20 Claims, 10 Drawing Sheets

(52) U.S. Cl.
 CPC ............... *G06F 3/04164* (2019.05); *G06F 2203/04103* (2013.01); *G06F 2203/04111* (2013.01); *G06F 2203/04112* (2013.01)

(56) References Cited

U.S. PATENT DOCUMENTS

2018/0032193 A1* 2/2018 Qu .................. G06F 3/04164
2018/0348902 A1* 12/2018 Zhang ................ G06F 3/0443
2019/0265820 A1   8/2019 Li

FOREIGN PATENT DOCUMENTS

| CN | 107831943 A | 3/2018 |
| CN | 108319398 A | 7/2018 |

* cited by examiner

TOUCH SUBSTRATE, TOUCH CONTROL DISPLAY APPARATUS, METHOD OF FABRICATING TOUCH SUBSTRATE

CROSS-REFERENCE TO RELATED APPLICATION

This application is a national stage application under 35 U.S.C. § 371 of International Application No. PCT/CN2018/112167, filed Oct. 26, 2018, the contents of which are incorporated by reference in the entirety.

TECHNICAL FIELD

The present invention relates to display technology, more particularly, to a touch substrate, a touch control display apparatus, and a method of fabricating a touch substrate.

BACKGROUND

In recent years, touch devices have been widely used in many electronic devices such as mobile phones, computer display panels, touch screens, satellite navigation devices, digital cameras, etc. Examples of touch devices include a mutual-capacitance touch control device and a self-capacitance touch control device. In a mutual-capacitance touch control device, the touch electrodes include multiple touch scanning electrodes (Tx) and multiple touch sensing electrodes (Rx). In a self-capacitance touch control device, the touch electrode can achieve touch control function alone. When a finger touches a point on the touch control display panel, the capacitor of the finger superimposes on the touch panel capacitor, resulting in a change in the capacitance of the touch panel capacitor. Based on the capacitance change upon a touch event, the coordinates of the touch scanning electrode and the touch sensing electrode being touched may be determined. In detecting touch events, the mutual capacitive touch control display panel examines the touch scanning electrode array and the touch sensing electrode array sequentially. Touch resolution correlates with the distance between adjacent conductive channels. A smaller distance between adjacent conductive channels results in a higher touch resolution.

SUMMARY

In one aspect, the present invention provides a touch substrate having a touch sensing area, and a peripheral area for bonding circuit parts, comprising a first touch electrode layer comprising a plurality of first touch electrodes; a second touch electrode layer comprising a plurality of second touch electrodes; an insulating layer insulating the first touch electrode layer from the second touch electrode layer; a plurality of first touch signal lines extending across at least a portion of the touch sensing area into the peripheral area; and a plurality of vias extending through the insulating layer; wherein the plurality of first touch signal lines are respectively connected to the plurality of first touch electrodes respectively through the plurality of vias; and the plurality of first touch signal lines and the plurality of second touch electrodes are in a same layer.

Optionally, the plurality of vias are in the touch sensing area; and the plurality of first touch signal lines are respectively connected to the plurality of first touch electrodes respectively through the plurality of vias in the touch sensing area.

Optionally, the touch substrate further comprises a plurality of second touch signal lines respectively connected to the plurality of second touch electrodes; wherein the plurality of second touch signal lines, the plurality of first touch signal lines, and the second touch electrode layer are in a same layer.

Optionally, the plurality of first touch signal lines and the plurality of second touch signal lines are alternately arranged in at least a portion of the peripheral area.

Optionally, the plurality of first touch signal lines extend across the touch sensing area respectively by different lengths.

Optionally, the plurality of first touch electrodes are arranged successively along a first direction, each of the plurality of first touch electrodes extending substantially along a second direction different from the first direction; and the plurality of second touch electrodes are arranged successively along the second direction, each of the plurality of second touch electrodes extending substantially along the first direction.

Optionally, the plurality of first touch signal lines are substantially parallel to the first direction.

Optionally, the plurality of first touch signal lines are absent in a region corresponding to a boundary of the touch sensing area extending along the first direction.

Optionally, each of the plurality of first touch electrodes comprises a plurality of first electrode blocks electrically connected substantially along the second direction; each of the plurality of first touch signal lines comprises a first touch signal line block; an orthographic projection of the first touch signal line block on the insulating layer at least partially overlaps with an orthographic projection of one of the plurality of first electrode blocks of a respective one of the plurality of first touch electrodes on the insulating layer; and the first touch signal line block is connected to the one of the plurality of first electrode blocks of the respective one of the plurality of first touch electrodes through one or multiple ones of the plurality of vias extending through the insulating layer.

Optionally, the plurality of first touch electrodes are a plurality of first mesh electrodes; the plurality of second touch electrodes are a plurality of second mesh electrodes; and the first touch signal line block is a mesh electrode block.

Optionally, the touch substrate further comprises a plurality of first dummy patterns and a plurality of second dummy patterns; wherein the plurality of first dummy patterns and the plurality of first touch electrodes are in a same layer; and the plurality of second dummy patterns and the plurality of second touch electrodes are in a same layer.

Optionally, at least one of the plurality of first touch signal lines extends along a path having at least one of the plurality of second dummy patterns on a first side and at least one of the plurality of second dummy patterns on a second side.

Optionally, the plurality of second touch electrodes are arranged successively along a second direction, each of the plurality of second touch electrodes extending substantially along a first direction different from the second direction; each of the plurality of second touch electrodes comprises a plurality of second electrode blocks electrically connected substantially along the first direction; on the first side of the at least one of the plurality of first touch signal lines, multiple ones of the plurality of second dummy patterns and multiple ones of the plurality of second electrode blocks are alternately arranged; and on the second side of the at least one of the plurality of first touch signal lines, multiple ones of the plurality of second dummy patterns and multiple ones of the plurality of second electrode blocks are alternately arranged.

Optionally, the peripheral area is an area abutting only one side of the touch sensing area.

In another aspect, the present invention provides a touch control display apparatus comprising the touch substrate described herein or fabricated by a method described herein; and a touch control integrated circuit.

Optionally, the touch control display apparatus has a display area corresponding to the touch sensing area, the touch control display apparatus configured to display image in the display area; and the plurality of first touch signal lines extend across at least a portion of the display area into the peripheral area.

Optionally, the plurality of vias are in the display area; and the plurality of first touch signal lines are respectively connected to the plurality of first touch electrodes respectively through the plurality of vias in the display area.

Optionally, the plurality of first touch signal lines extend across the display area respectively by different lengths.

Optionally, the touch control display apparatus further comprises a black matrix in a region corresponding to the peripheral area of the touch substrate; wherein the plurality of first touch electrodes are arranged successively along a first direction, each of the plurality of first touch electrodes extending substantially along a second direction; the plurality of second touch electrodes are arranged successively along the second direction, each of the plurality of second touch electrodes extending substantially along the first direction; and the black matrix is absent in a region corresponding to at least a portion of a boundary of the touch sensing area extending along the first direction.

In another aspect, the present invention provides a method of fabricating a touch substrate having a touch sensing area, and a peripheral area for bonding circuit parts, comprising forming a first touch electrode layer comprising a plurality of first touch electrodes; forming a second touch electrode layer comprising a plurality of second touch electrodes; forming an insulating layer, the insulating layer formed between the first touch electrode layer and the second touch electrode layer for insulating the first touch electrode layer from the second touch electrode layer; forming a plurality of vias extending through the insulating layer; and forming a plurality of first touch signal lines extending across at least a portion of the touch sensing area into the peripheral area; wherein the plurality of first touch signal lines are respectively connected to the plurality of first touch electrodes respectively through the plurality of vias; and the plurality of first touch signal lines and the plurality of second touch electrodes are formed in a same layer.

Optionally, the method further comprises forming a plurality of second touch signal lines respectively connected to the plurality of second touch electrodes; wherein the plurality of second touch signal lines, the plurality of first touch signal lines, and the plurality of second touch electrodes are formed in a same layer.

Optionally, forming the first touch electrode layer comprises forming the plurality of first touch electrodes successively along a first direction, each of the plurality of first touch electrodes formed to extend substantially along a second direction; forming the second touch electrode layer comprises forming the plurality of second touch electrodes successively along the second direction, each of the plurality of second touch electrodes formed to extend substantially along the first direction; and the plurality of first touch signal lines are formed to be substantially parallel to the first direction.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch substrate, a touch control display apparatus, and a method of fabricating a touch substrate that substantially obviate one or more of the problems due to limitations and disadvantages of the related art. In one aspect, the present disclosure provides a touch substrate having a touch sensing area, and a peripheral area for bonding circuit part. In some embodiments, the touch substrate includes a first touch electrode layer including a plurality of first touch electrodes; a second touch electrode layer including a plurality of second touch electrodes; an insulating layer insulating the first touch electrode layer from the second touch electrode layer; a plurality of first touch signal lines extending across at least a portion of the touch sensing area into the peripheral area; and a plurality of vias extending through the insulating layer. The plurality of first touch signal lines are respectively connected to the plurality of first touch electrodes respectively through the plurality of vias. Optionally, the plurality of first touch signal lines and the plurality of second touch electrodes are in a same layer.

Figure 1:
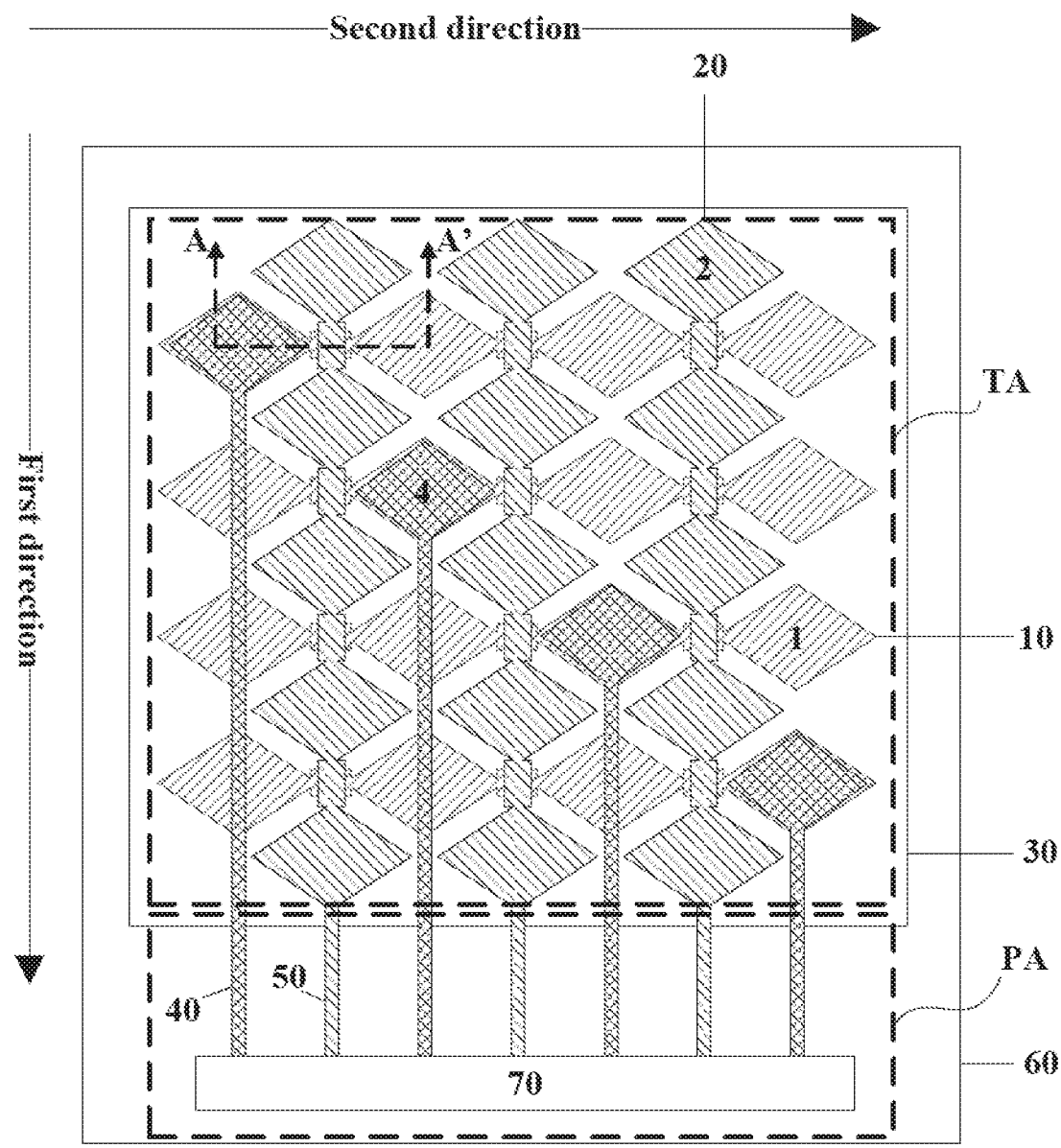
FIG. 1 is a schematic diagram illustrating the structure of a touch substrate in some embodiments according to the present disclosure.
Figure 2:
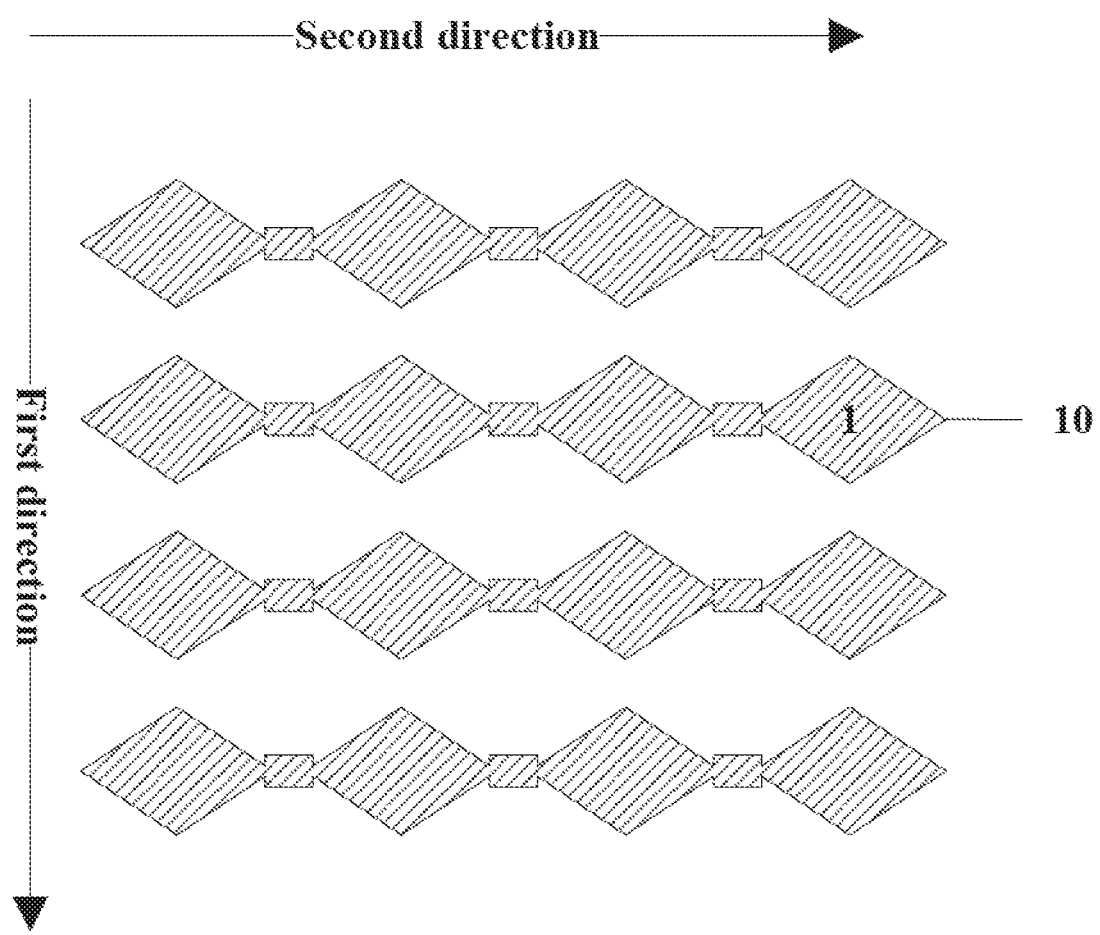
FIG. 2 is a schematic diagram illustrating the structure of a first touch electrode layer in some embodiments according to the present disclosure.
Figure 3:
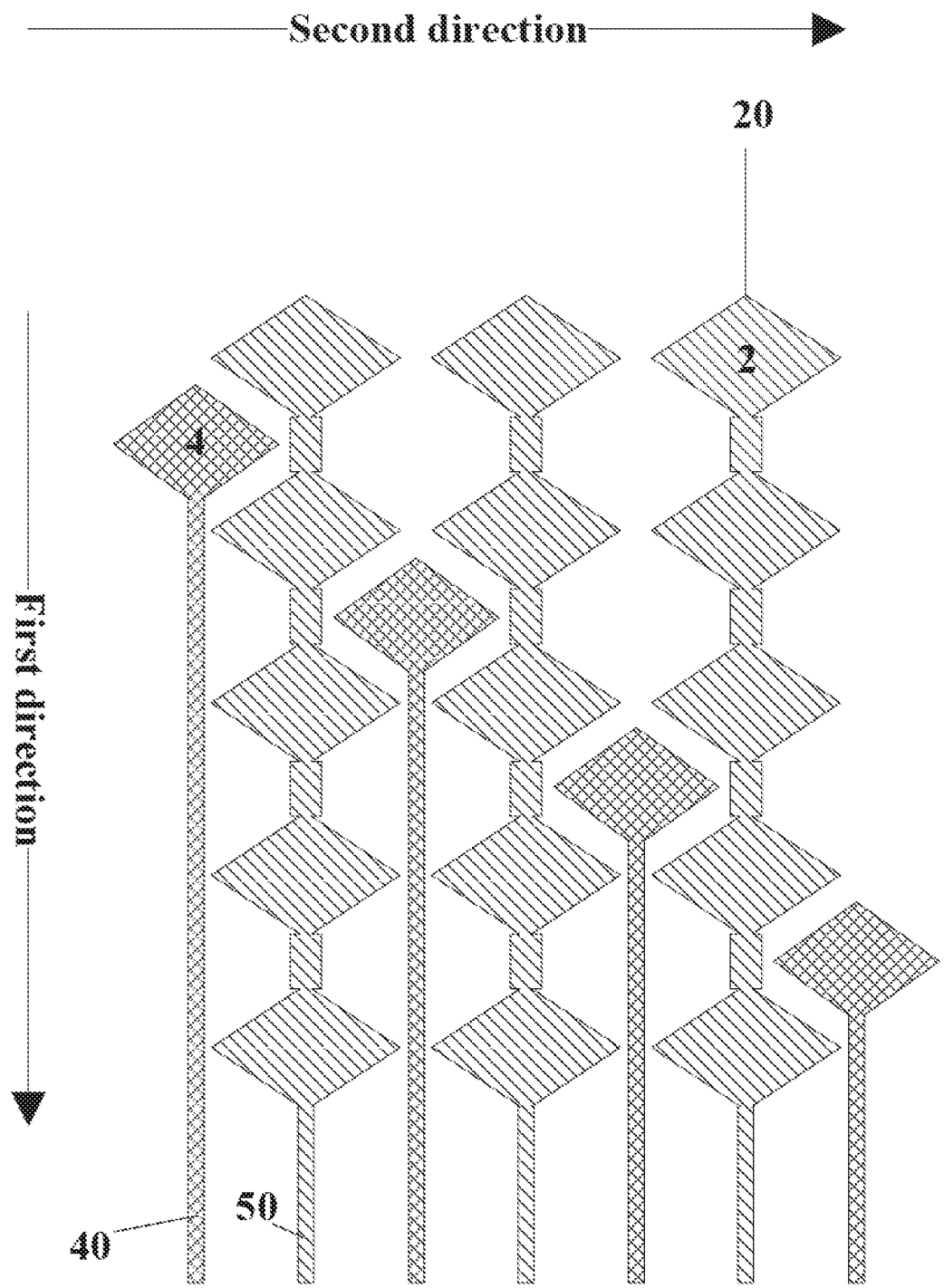
FIG. 3 is a schematic diagram illustrating the structure of a second touch electrode layer in some embodiments according to the present disclosure.
Figure 4:
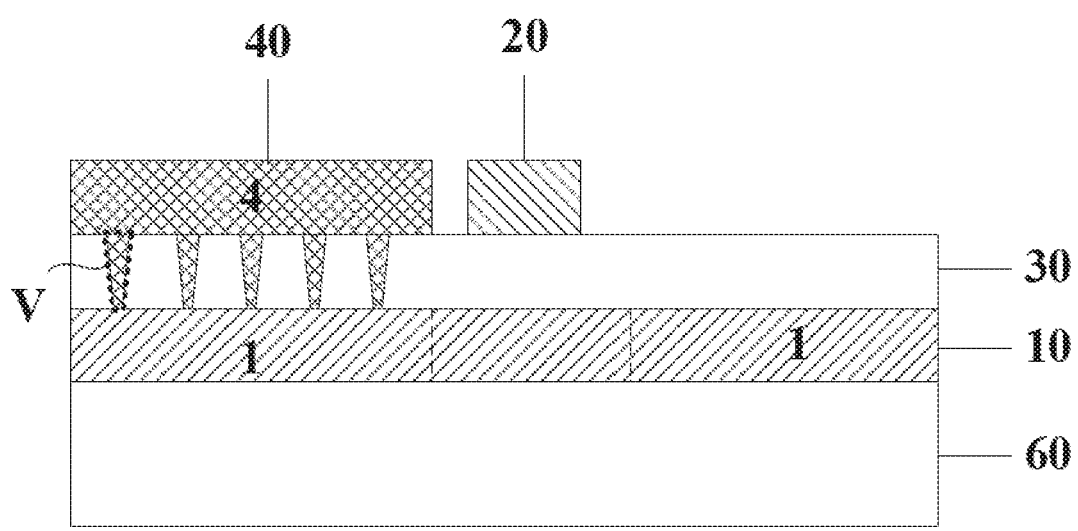
FIG. 4 is a cross-section view along the A-A' line in FIG. 1.

FIG. 1 is a schematic diagram illustrating the structure of a touch substrate in some embodiments according to the present disclosure. FIG. 2 is a schematic diagram illustrating the structure of a first touch electrode layer in some embodiments according to the present disclosure. FIG. 3 is a schematic diagram illustrating the structure of a second touch electrode layer in some embodiments according to the present disclosure. FIG. 4 is a cross-section view along the A-A' line in FIG. 1. Referring to FIGS. 1 to 4, the touch substrate in some embodiments includes a base substrate 60, a first touch electrode layer including a plurality of first touch electrodes 10 on the base substrate 60, an insulating layer 30 on a side of the first touch electrode layer distal to the base substrate 60, and a second touch electrode layer including a plurality of second touch electrodes 20 on a side of the insulating layer 30 distal to the base substrate 60. Referring to FIG. 2, the plurality of first touch electrodes 10 are arranged successively along a first direction, each of the plurality of first touch electrodes 10 extends substantially along a second direction. Referring to FIG. 3, the plurality of second touch electrodes 20 are arranged successively along the second direction, each of the plurality of second touch electrodes 20 extends substantially along the first direction. Referring to FIG. 1 and FIG. 4, the insulating layer 30 is between the first touch electrode layer and the second touch electrode layer.

In some embodiments, the touch substrate further includes a plurality of first touch signal lines 40 and a plurality of second touch signal lines 50 for conducting touch signals, e.g., touch scanning signals and touch sensing signals.

The touch substrate includes a touch sensing area TA occupied by touch electrodes for sensing a touch action. The touch substrate further includes a peripheral area PA for bonding circuit parts. In the peripheral area PA, the plurality of first touch signal lines 40 and the plurality of second touch signal lines 50 are configured to bond with a touch control integrated circuit, e.g., through a plurality of bonding pads. The plurality of first touch signal lines 40 and the plurality of second touch signal lines 50 are at least partially in the peripheral area PA. Referring to FIG. 1, the plurality of second touch signal lines 50 in some embodiments are substantially in the peripheral area PA, each of which extending from an end of a respective one of the plurality of second touch electrodes 20 into a bonding area 70. The plurality of first touch signal lines 40 extend across at least a portion of the touch sensing area TA into the peripheral area PA. Each of the plurality of first touch signal lines 40 is partially in the touch sensing area TA and partially in the peripheral area PA.

Referring to FIG. 1 and FIG. 4, the touch substrate in some embodiments further includes a plurality of vias V extending through the insulating layer 30. The plurality of first touch signal lines 40 are respectively connected to the plurality of first touch electrodes 10 respectively through the plurality of vias V. Optionally, the plurality of first touch signal lines 40 are connected to the plurality of first touch electrodes 10 in a one-to-one correspondence relationship. For example, each of the plurality of first touch signal lines 40 is connected to one of the plurality of first touch electrodes 10, any two of the plurality of first touch signal lines 40 are respectively connected to two different ones of the plurality of first touch electrodes 10. Each individual one of the plurality of first touch signal lines 40 is connected to a respective one of the plurality of first touch electrodes 10 through one or multiple ones of the plurality of vias V extending through the insulating layer 30. Referring to FIG. 4, in some embodiments, each individual one of the plurality of first touch signal lines 40 is connected to a respective one of the plurality of first touch electrodes 10 through multiple ones of the plurality of vias V extending through the insulating layer 30.

In some embodiments, the plurality of vias V are in the touch sensing area TA. The plurality of first touch signal lines 40 are respectively connected to the plurality of first touch electrodes 10 respectively through the plurality of vias V in the touch sensing area TA. Optionally, an orthographic projection of the plurality of first touch electrodes 10 on the base substrate 60 completely covers an orthographic projection of connecting structures respectively extending through the plurality of vias V on the base substrate 60.

In some embodiments, each of the plurality of first touch electrodes 10 includes a plurality of first touch electrode blocks 1 electrically connected substantially along the second direction. Optionally, each of the plurality of second touch electrodes 20 includes a plurality of second touch electrode blocks 2 electrically connected substantially along the first direction. Optionally, each of the plurality of first touch signal lines 40 includes a first touch signal line block 4, through which the first touch signal line 40 is connected to one of the plurality of first touch electrode blocks 1 of the respective one of the plurality of first touch electrodes 10. Referring to FIG. 1 and FIG. 4, an orthographic projection of the first touch signal line block 4 on the insulating layer 30 at least partially overlaps with an orthographic projection of one of the plurality of first touch electrode blocks 1 of the respective one of the plurality of first touch electrodes 10 on the insulating layer 30. Optionally, the orthographic projection of the first touch signal line block 4 on the insulating layer 30 substantially overlaps with the orthographic projection of one of the plurality of first touch electrode blocks 1 of the respective one of the plurality of first touch electrodes 10 on the insulating layer 30. As used herein, the term "substantially overlap" refers to two orthographic projections at least 80%, at least 85%, at least 90%, at least 95%, at least 99%, overlapping with each other. Optionally, the orthographic projection of the first touch signal line block 4 on the insulating layer 30 completely overlaps with the orthographic projection of one of the plurality of first touch electrode blocks 1 of the respective one of the plurality of first touch electrodes 10 on the insulating layer 30. Optionally, a shape of the first touch signal line block 4 is substantially same as a shape of the one of the plurality of first touch electrode blocks 1 of the respective one of the plurality of first touch electrodes 10.

Referring to FIG. 1, FIG. 3, and FIG. 4, in some embodiments, the plurality of first touch signal lines 40 and the plurality of second touch electrodes 20 are in a same layer, e.g., made of a same material, formed in single patterning process using a single mask plate. Further, the plurality of first touch signal lines 40, the plurality of second touch signal lines 50, and the plurality of second touch electrodes 20 are in a same layer. The plurality of first touch electrodes 10 are in a layer different from the plurality of first touch signal lines 40. As used herein, the term "same layer" refers to the relationship between the layers simultaneously formed in the same step. In one example, the plurality of first touch signal lines 40 and the plurality of second touch electrodes 20 are in a same layer when they are formed as a result of one or more steps of a same patterning process performed in a same layer of material. In another example, the plurality of first touch signal lines 40 and the plurality of second touch electrodes 20 can be formed in a same layer by simultaneously performing the step of forming the plurality of first touch signal lines 40 and the step of forming the plurality of second touch electrodes 20. The term "same layer" does not always mean that the thickness of the layer or the height of the layer in a cross-sectional view is the same.

In some embodiments, the plurality of first touch electrodes 10 constitute a plurality of rows of first touch electrodes, and the plurality of second touch electrodes 20 constitute a plurality of columns of second touch electrodes. The plurality of first touch signal lines 40 are respectively connected to the plurality of rows of first touch electrodes, and the plurality of second touch signal lines 50 are respectively connected to the plurality of columns of second touch electrodes. In some embodiments, and referring to FIG. 1, in at least a portion of the peripheral area PA, the plurality of first touch signal lines 40 and the plurality of second touch signal lines 50 are alternately arranged. Optionally, at an interface between the touch sensing area TA and the peripheral area PA, the plurality of first touch signal lines 40 and the plurality of second touch signal lines 50 are alternately arranged, as they extend out of the touch sensing area TA into the peripheral area PA.

Referring to FIG. 1 and FIG. 3, the plurality of first touch signal lines 40 are respectively connected to the plurality of rows of first touch electrodes. Accordingly, the plurality of first touch signal lines 40 extend across the touch sensing area TA respectively by different lengths. For example, four signal lines of the plurality of first touch signal lines 40 are shown in FIG. 1, the first one extends across four rows of the plurality of rows of first touch electrodes in the touch sensing area TA, the second one extends across three rows of the plurality of rows of first touch electrodes in the touch sensing area TA, the third one extends across two rows of the plurality of rows of first touch electrodes in the touch sensing area TA, and the fourth one extends across one row of the plurality of rows of first touch electrodes in the touch sensing area TA.

In some embodiments, the plurality of first touch signal lines 40 and the plurality of second touch signal lines 50 are substantially parallel to each other. For example, the plurality of first touch signal lines 40 extend substantially along the first direction, and the plurality of second touch signal lines 50 extend substantially along the first direction. Accordingly, the plurality of first touch signal lines 40 are absent in a region corresponding to a boundary of the touch sensing area TA extending along the first direction (the left side and right side of the touch sensing area TA in FIG. 1). The plurality of first touch signal lines 40 are present in a region corresponding to a boundary of the touch sensing area TA extending along the second direction (the bottom side of the touch sensing area TA in FIG. 1). As used herein, the term "substantially parallel" means that an angle between two signal lines is in the range of 0 degree to approximately 45 degrees, e.g., 0 degree to approximately 5 degrees, 0 degree to approximately 10 degrees, 0 degree to approximately 15 degrees, 0 degree to approximately 20 degrees, 0 degree to approximately 25 degrees, 0 degree to approximately 30 degrees.

Figure 5:
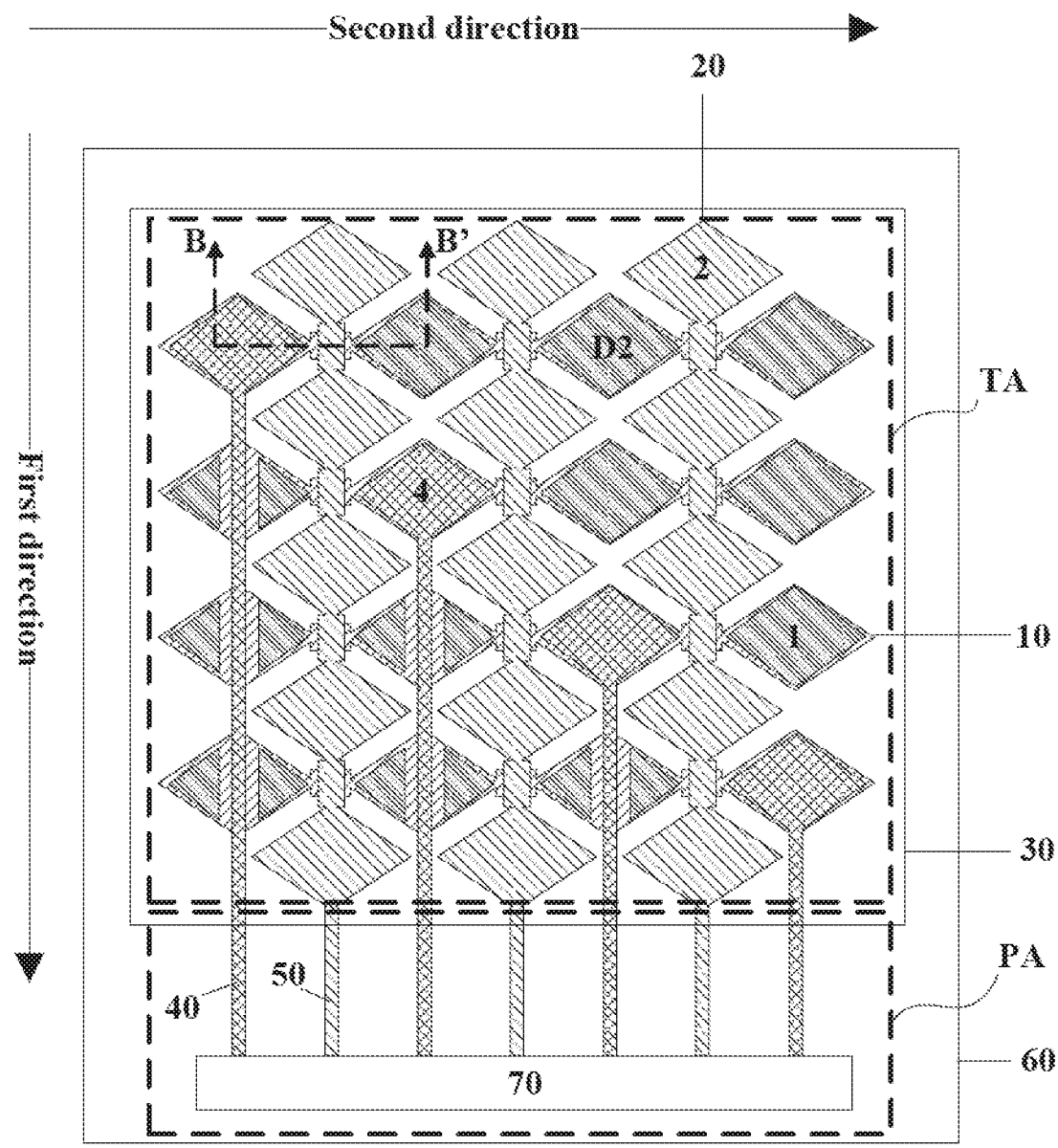
FIG. 5 is a schematic diagram illustrating the structure of a touch substrate in some embodiments according to the present disclosure.
Figure 6:
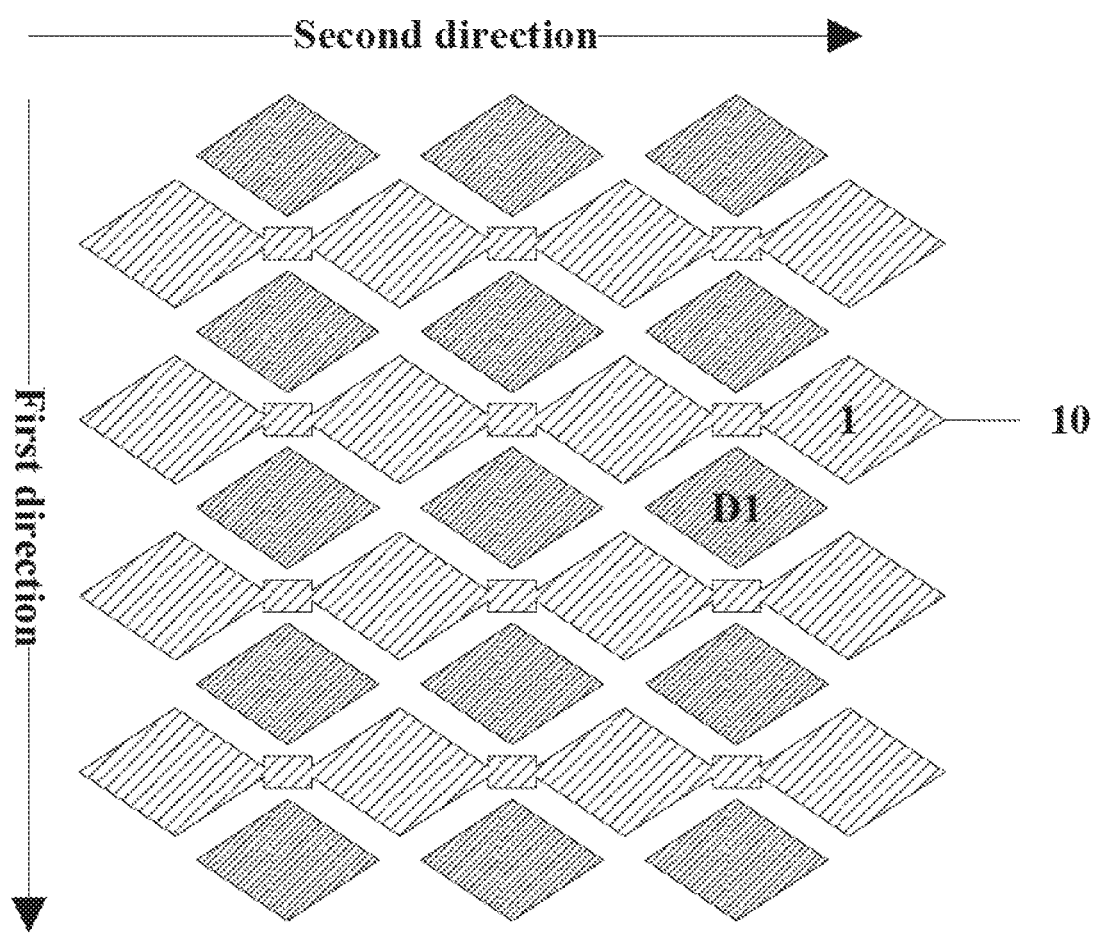
FIG. 6 is a schematic diagram illustrating the structure of a first touch electrode layer in some embodiments according to the present disclosure.
Figure 7:
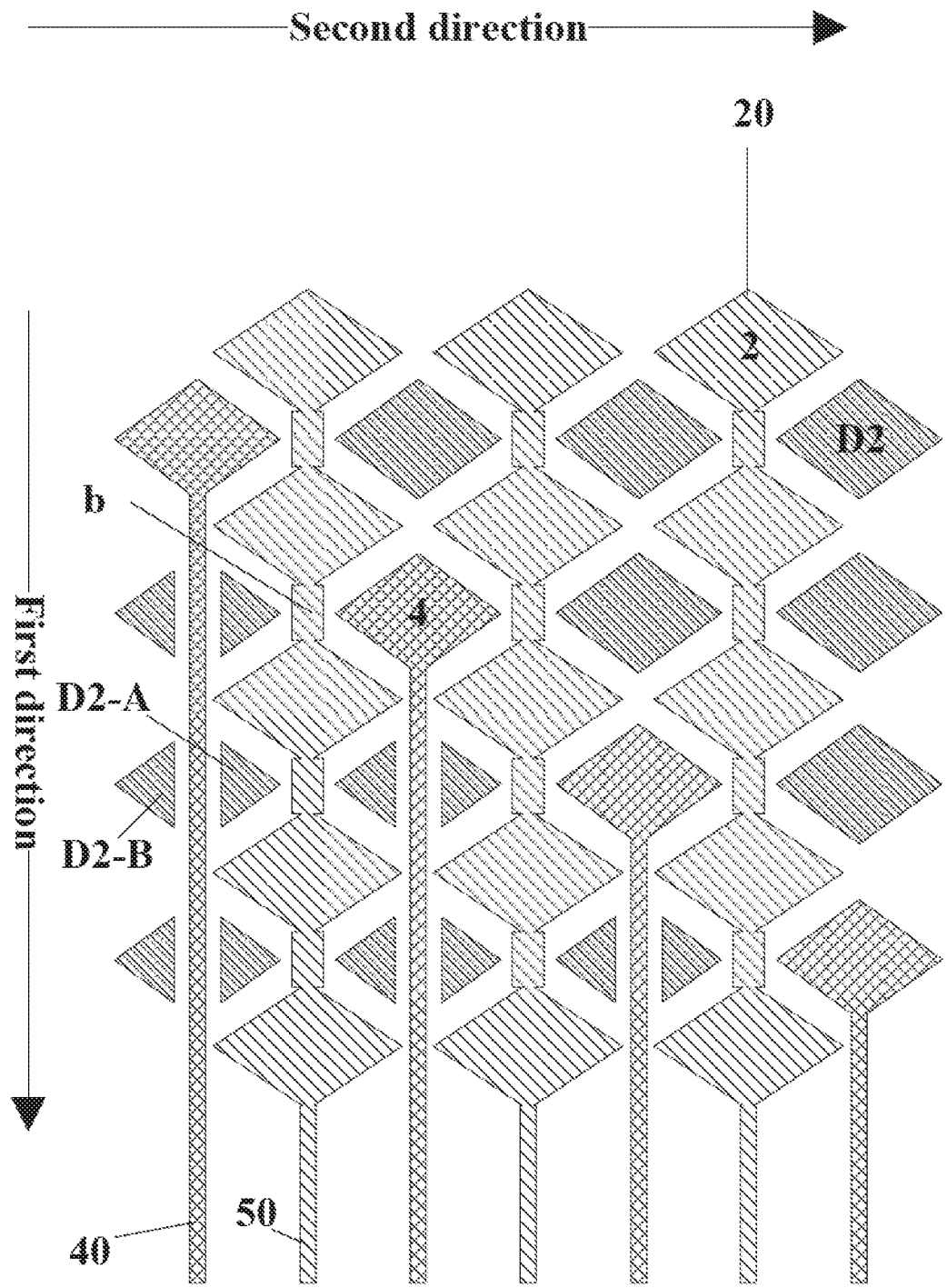
FIG. 7 is a schematic diagram illustrating the structure of a second touch electrode layer in some embodiments according to the present disclosure.
Figure 8:
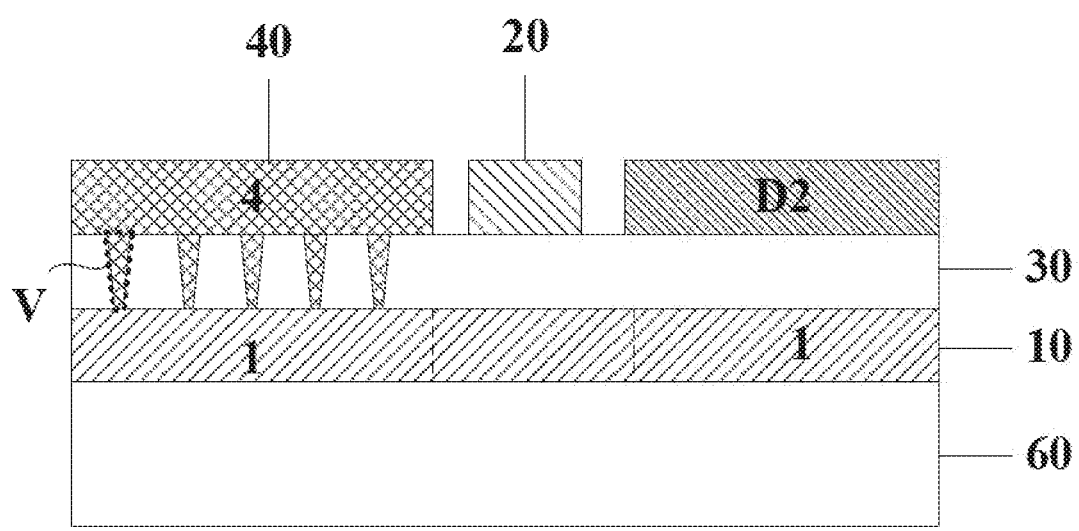
FIG. 8 is a cross-section view along the B-B' line in FIG. 5.

In some embodiments, the touch substrate further includes a plurality of dunny patterns in positions between touch electrode blocks. FIG. 5 is a schematic diagram illustrating the structure of a touch substrate in some embodiments according to the present disclosure. FIG. 6 is a schematic diagram illustrating the structure of a first touch electrode layer in some embodiments according to the present disclosure. FIG. 7 is a schematic diagram illustrating the structure of a second touch electrode layer in some embodiments according to the present disclosure. FIG. 8 is a cross-section view along the B-B' line in FIG. 5. Referring to FIGS. 5 to 8, the touch substrate in some embodiments further includes a plurality of first dummy patterns D1 in a same layer as the plurality of first touch electrodes 10, and a plurality of second dummy patterns D2 in a same layer as the plurality of second touch electrodes 20. As used herein, the term "dummy pattern" refers to a pattern that is not employed for passing a touch signal. Optionally, a dummy pattern is floating. Optionally, a dummy pattern is provided between adjacent touch electrode blocks. The dummy pattern is used to fill the gap between adjacent bridges respectively connecting touch electrode blocks in two adjacent rows or two adjacent columns in a same layer. The dummy pattern may be formed so as to prevent the region(s) of adjacent touch electrode blocks and the gap therebetween from being differently recognized. Optionally, the dummy pattern is in a floating state in which the dummy pattern is not connected to any of the touch electrode blocks.

In selected positions in the touch substrate, the touch substrate can have the first touch signal line block 4 in lieu of a dummy pattern. Referring to FIG. 7, the first touch signal line block 4 is disposed in the gap between adjacent bridges b respectively connecting second touch electrode blocks in two adjacent columns of the plurality of second touch electrode blocks 2, an excellent blanking effect can be achieved by having this structure. In some embodiments, the plurality of second dummy patterns D2 includes a plurality of dummy patterns D2-A and a plurality of dummy patterns D2-B. Further, at least one of the plurality of first touch signal lines 40 in some embodiments extends along a path having at least one of the plurality of dummy patterns D2-A on a first side (e.g., on the left side in FIG. 7) and at least one of the plurality of dummy patterns D2-B on a second side (e.g., on the right side in FIG. 7). Optionally, on the first side of the at least one of the plurality of first touch signal lines 40, multiple ones of the plurality of dummy patterns D2-A and multiple ones of the second touch electrode blocks 2 are alternately arranged; on the second side of the at least one of the plurality of first touch signal lines 40, multiple ones of the plurality of dummy patterns D2-B and multiple ones of the second touch electrode blocks 2 are alternately arranged.

Various appropriate conductive materials and various appropriate fabricating methods may be used to make the plurality of first touch electrode blocks 1, the plurality of second touch electrode blocks 2, the first touch signal line block 4, the plurality of first dummy patterns D1, and the plurality of second dummy patterns D2. For example, a conductive electrode material may be deposited on the substrate, e.g., by sputtering or vapor deposition or solution coating; and patterned. Examples of conductive electrode materials for making the plurality of first touch electrode blocks 1, the plurality of second touch electrode blocks 2, the first touch signal line block 4, the plurality of first dummy patterns D1, and the plurality of second dummy patterns D2 include, but are not limited to, various transparent metal oxide electrode materials, transparent nano-carbon tubes, a metal mesh, a nano-silver mesh, a carbon nano tube, a nano mesh, graphene, and conductive polymers such as poly(3,4-ethylenedioxythiophene) polystyrene sulfonate (PEDOT:PSS). Examples of transparent metal oxide materials include, but are not limited to, indium tin oxide, indium zinc oxide, indium gallium oxide, and indium gallium zinc oxide.

In some embodiments, the plurality of first touch electrode blocks 1 are a plurality of first mesh electrodes, the plurality of second touch electrode blocks 2 are a plurality of second mesh electrodes, and the first touch signal line block 4 is a mesh electrode block. Optionally, the plurality of first dummy patterns D1 and the plurality of second dummy patterns D2 are mesh electrodes. Examples of transparent conductive materials suitable for making the mesh electrodes include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the mesh electrode is made of a metal mesh such as a nano-silver mesh. Various appropriate mesh aperture ratios, mesh line widths, mesh line thicknesses, and opening widths may be used for making the mesh electrode. The mesh aperture ratios, mesh line widths, mesh line thicknesses, and opening widths may be selected to achieve optimal electrical conductivity and low resistance.

In some embodiments, and referring to FIG. 1 and FIG. 5, the peripheral area PA is an area abutting only one side of the touch sensing area TA. By having the peripheral area PA (including a circuit bonding region) abutting a portion of a periphery (e.g., only one edge) of the touch sensing area TA and having the terminals of the plurality of first touch signal lines 40 and the terminals of the plurality of second touch signal lines 50 in the peripheral area PA, the touch substrate can be made to have a frame on only one portion of the periphery (e.g., on only one edge). By having this design, three edges of the display portion can be frameless, the touch substrate includes a frame along only one edge of the touch substrate, i.e., the edge corresponding to the peripheral area PA.

Figure 9:
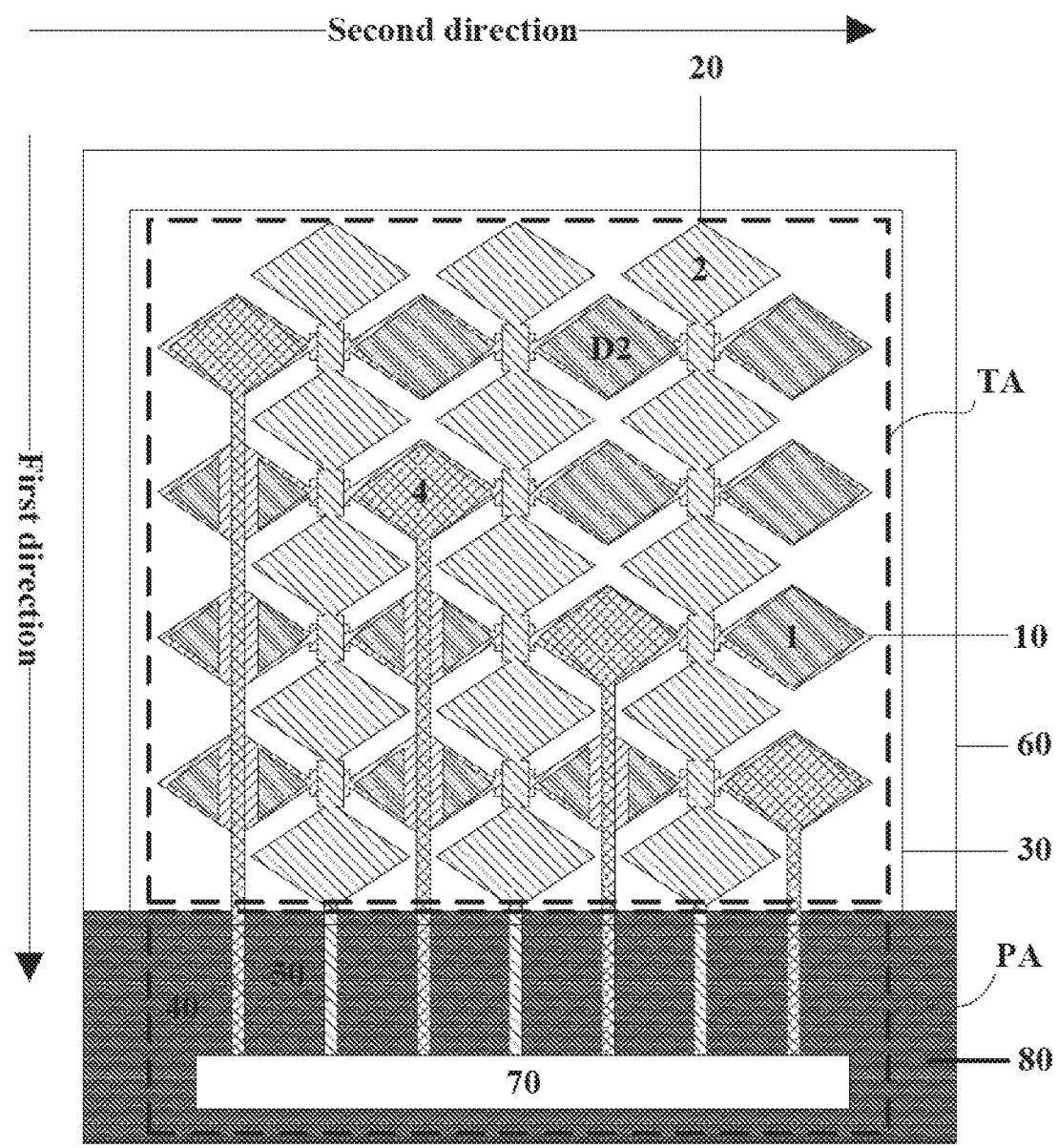
FIG. 9 is a schematic diagram illustrating the structure of a touch substrate in some embodiments according to the present disclosure.

FIG. 9 is a schematic diagram illustrating the structure of a touch substrate in some embodiments according to the present disclosure. Referring to FIG. 9, the touch substrate in some embodiments further includes a black matrix 80 in a region corresponding to the peripheral area PA of the touch substrate. Optionally, the black matrix 80 is absent in a region corresponding to at least a portion of a boundary of the touch sensing area TA extending along the first direction. The black matrix may be made of a black material such as a metal or metal oxide (e.g., chromium or chromium oxide), and a pigment-containing resin, etc.

Figure 10:
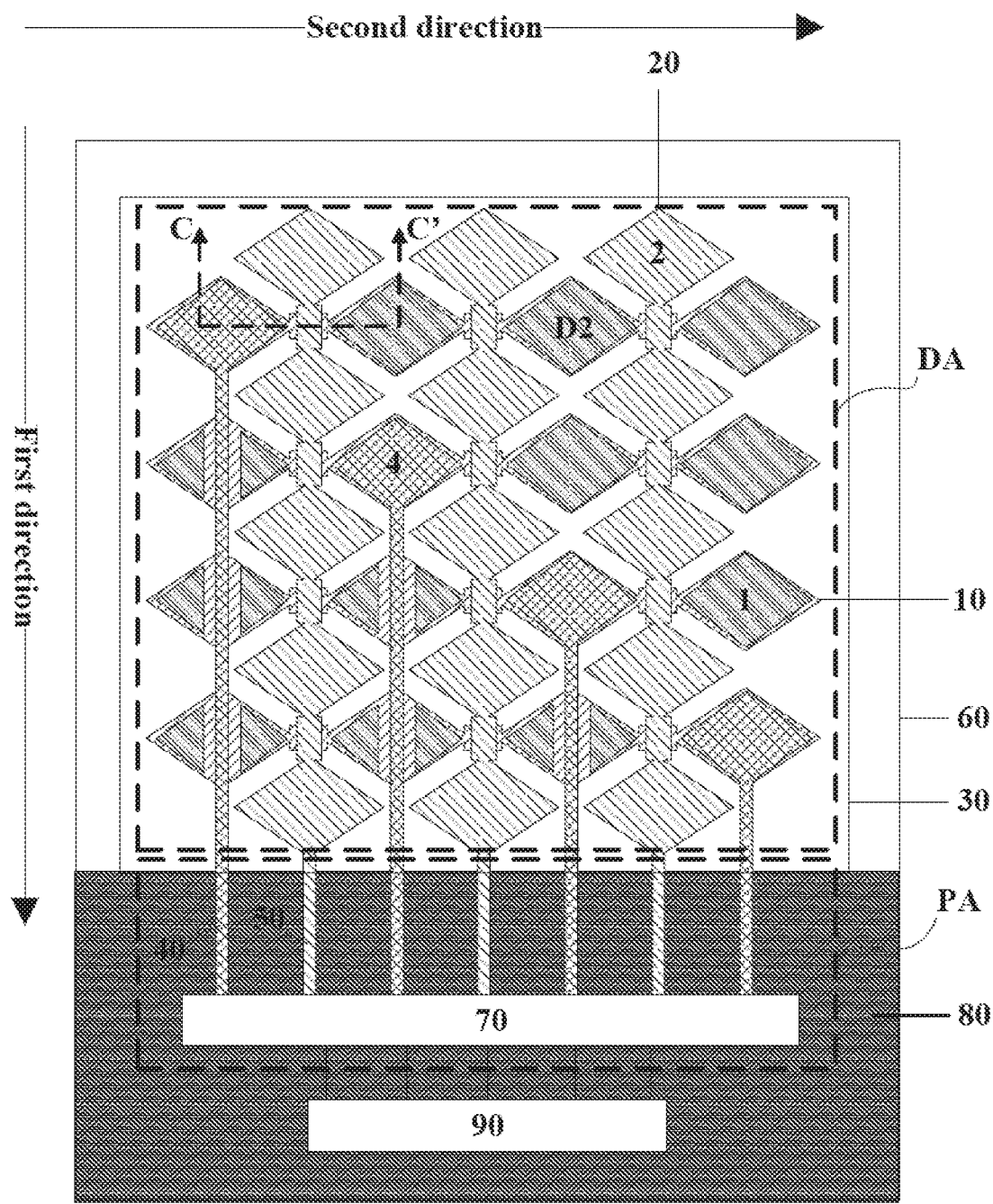
FIG. 10 is a schematic diagram illustrating the structure of a touch control display apparatus in some embodiments according to the present disclosure.

In another aspect, the present disclosure further provides a touch control display apparatus having the touch substrate described herein or fabricated by a method described herein. FIG. 10 is a schematic diagram illustrating the structure of a touch control display apparatus in some embodiments according to the present disclosure. Referring to FIG. 10, the touch control display apparatus in some embodiments includes a touch substrate described herein and a touch control integrated circuit 90. The plurality of first touch signal lines 40 and the plurality of second touch signal lines 50 are connected to the touch control integrated circuit 90 through the bonding area 70.

Referring to FIG. 10, the touch control display apparatus has a display area DA corresponding to the touch sensing area in the touch substrate, the touch control display apparatus is configured to display image in the display area DA. The peripheral area PA abuts the display area DA. As shown in FIG. 10, the plurality of first touch signal lines 40 extend across at least a portion of the display area DA into the peripheral area PA. FIG. 8 is a cross-section view along the C-C' line in FIG. 10. Referring to FIG. 10 and FIG. 8, in some embodiments, the plurality of vias V are in the display area DA, and the plurality of first touch signal lines 40 are respectively connected to the plurality of first touch electrodes 10 respectively through the plurality of vias V in the display area DA.

Referring to FIG. 10 and FIG. 8, the plurality of first touch signal lines 40 are respectively connected to the plurality of rows of first touch electrodes. Accordingly, the plurality of first touch signal lines 40 extend across the display area DA respectively by different lengths.

The touch control display apparatus further includes a black matrix 80 in a region corresponding to the peripheral area PA of the touch substrate. Optionally, the black matrix 80 is absent in a region corresponding to at least a portion of a boundary of the display area DA extending along the first direction.

Optionally, the touch control display apparatus is an in-cell touch control display apparatus. Optionally, the touch control display apparatus is an on-cell touch control display apparatus. Optionally, the touch control display apparatus is an add-on type touch control display apparatus. Optionally, the add-on type touch control display apparatus has touch electrodes embedded on a glass surface. Optionally, the add-on type touch control display apparatus has touch electrodes embedded on a thin film. Optionally, the add-on type touch control display apparatus is a one-glass-solution type touch control display apparatus. In the one-glass-solution type touch control display apparatus, touch electrodes are integrated on a cover glass. Optionally, the add-on type touch control display apparatus is a glass-film-film type touch control display apparatus. Optionally, the touch control display apparatus is a self-capacitive touch display apparatus. Optionally, the touch control display apparatus is a mutual capacitive touch display apparatus. Examples of appropriate touch display apparatuses include, but are not limited to, an electronic paper, a mobile phone, a tablet computer, a television, a monitor, a notebook computer, a digital album, a GPS, etc.

In another aspect, the present disclosure provides a method of fabricating a touch substrate having a touch sensing area, and a peripheral area for bonding circuit parts. In some embodiments, the method includes forming a first touch electrode layer including a plurality of first touch electrodes; forming a second touch electrode layer including a plurality of second touch electrodes; forming an insulating layer, the insulating layer formed between the first touch electrode layer and the second touch electrode layer for insulating the first touch electrode layer from the second touch electrode layer; forming a plurality of vias extending through the insulating layer; and forming a plurality of first touch signal lines extending across at least a portion of the touch sensing area into the peripheral area. Optionally, the plurality of first touch signal lines are respectively connected to the plurality of first touch electrodes respectively through the plurality of vias. Optionally, the plurality of first touch signal lines and the plurality of second touch electrodes are formed in a same layer.

In some embodiments, the method includes forming a first conductive material layer on a base substrate, patterning the first conductive material layer to form a plurality of first touch electrodes and optionally a plurality of first dummy patterns, e.g., in a single patterning process using a single mask plate. Optionally, the plurality of first touch electrodes are formed successively along a first direction, each of the plurality of first touch electrodes extending substantially along a second direction. Optionally, forming each of the plurality of first touch electrodes includes forming a plurality of first electrode blocks electrically connected substantially along the second direction. The plurality of first dummy patterns are formed in gaps between adjacent bridges respectively connecting first touch electrode blocks in two adjacent rows of the plurality of first touch electrodes.

The plurality of first touch signal lines and the plurality of second touch electrodes are formed in a same layer.

Subsequent to forming the first touch electrode layer, the insulating layer is formed on a side of the first touch electrode layer distal to the base substrate. A plurality of vias are formed to extend through the insulating layer, thereby exposing respective portions of multiple first touch electrode blocks respective in the plurality of first touch electrodes. The plurality of vias are optionally formed in the touch sensing area.

Subsequent to forming the plurality of vias, a second conductive material layer is formed on a side of the insulating layer distal to the base substrate. The method further includes patterning the second conductive material layer to form a plurality of second touch electrodes, a plurality of first touch signal lines, a plurality of second touch signal lines, and optionally a plurality of second dummy patterns, e.g., in a single patterning process using a single mask plate. The plurality of first touch signal lines are formed to be respectively connected to the plurality of first touch electrodes respectively through the plurality of vias in the touch sensing area, thereby respectively connected to the plurality of first touch electrodes. The plurality of second touch signal lines are formed to be respectively connected to the plurality of second touch electrodes. The plurality of second touch signal lines, the plurality of first touch signal lines, and the second touch electrode layer are in a same layer.

Optionally, the plurality of second touch electrodes are formed successively along the second direction, each of the plurality of second touch electrodes formed to extend substantially along the first direction. Optionally, the plurality of first touch signal lines are formed to be substantially parallel to the first direction. Optionally, the plurality of first touch signal lines and the plurality of second touch signal lines are formed to be substantially parallel to each other. For example, the plurality of first touch signal lines are formed to extend substantially along the first direction, and the plurality of second touch signal lines are formed to extend substantially along the first direction. Accordingly, the plurality of first touch signal lines are absent in a region corresponding to a boundary of the touch sensing area extending along the first direction. The plurality of first touch signal lines are present in a region corresponding to a boundary of the touch sensing area extending along the second direction.

In some embodiments, forming each of the plurality of first touch electrodes includes forming a plurality of first electrode blocks electrically connected substantially along the second direction, and forming each of the plurality of first touch signal lines includes forming a first touch signal line block. Optionally, the plurality of first touch signal lines and the plurality of first touch electrodes are formed so that an orthographic projection of the first touch signal line block on the insulating layer at least partially overlaps with an orthographic projection of one of the plurality of first electrode blocks of a respective one of the plurality of first touch electrodes on the insulating layer. Optionally, the plurality of first touch signal lines and the plurality of first touch electrodes are formed so that the orthographic projection of the first touch signal line block on the insulating layer substantially overlaps with the orthographic projection of one of the plurality of first electrode blocks of the respective one of the plurality of first touch electrodes on the insulating layer. Optionally, the plurality of first touch signal lines and the plurality of first touch electrodes are formed so that the orthographic projection of the first touch signal line block on the insulating layer completely overlaps with the orthographic projection of one of the plurality of first electrode blocks of the respective one of the plurality of first touch electrodes on the insulating layer. Optionally, the plurality of first touch signal lines and the plurality of first touch electrodes are formed so that a shape of the first touch signal line block is substantially same as a shape of the one of the plurality of first electrode blocks of the respective one of the plurality of first touch electrodes. Optionally, the first touch signal line block is connected to the one of the plurality of first electrode blocks of the respective one of the plurality of first touch electrodes through one or multiple ones of the plurality of vias extending through the insulating layer.

In some embodiments, in at least a portion of the peripheral area, the plurality of first touch signal lines and the plurality of second touch signal lines are formed to be alternately arranged. Optionally, at an interface between the touch sensing area and the peripheral area, the plurality of first touch signal lines and the plurality of second touch signal lines are formed to be alternately arranged, as they extend out of the touch sensing area into the peripheral area.

In some embodiments, the plurality of first touch signal lines are formed to extend across the touch sensing area respectively by different lengths.

In some embodiments, forming the plurality of first touch electrodes includes forming a plurality of first mesh electrodes, forming the plurality of second touch electrodes includes forming a plurality of second mesh electrodes, and forming the first touch signal line block includes forming a mesh electrode block.

In some embodiments, the method further includes forming a plurality of first dummy patterns in a same layer as the first touch electrode layer, and forming a plurality of second dummy patterns in a same layer as the second touch electrode layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate having a touch sensing area, and a peripheral area for bonding circuit parts, comprising:
a first touch electrode layer comprising a plurality of first touch electrodes;
a second touch electrode layer comprising a plurality of second touch electrodes;
an insulating layer insulating the first touch electrode layer from the second touch electrode layer;
a plurality of first touch signal lines extending across at least a portion of the touch sensing area into the peripheral area;
a plurality of vias extending through the insulating layer; and
a plurality of second touch signal lines respectively connected to the plurality of second touch electrodes;
wherein the plurality of first touch signal lines are respectively connected to the plurality of first touch electrodes respectively through the plurality of vias;
a respective one of the plurality of first touch electrodes comprises a plurality of first electrode blocks electrically connected substantially along a second direction;
a respective first touch signal line of the plurality of first touch signal lines comprises a first touch signal line block;
at least 80% of an orthographic projection of a respective one of the plurality of first electrode blocks of a respective one of the plurality of first touch electrodes on the insulating layer overlaps with an orthographic projection of the first touch signal line block on the insulating layer; and
the first touch signal line block is connected to the one of the plurality of first electrode blocks of the respective one of the plurality of first touch electrodes through one or multiple ones of the plurality of vias extending through the insulating layer;
the respective first touch signal line of the plurality of first touch signal lines, including the first touch signal line block, is part of a first unitary structure;
a respective second touch electrode of the plurality of second touch electrodes comprises a plurality of second electrode blocks electrically connected substantially along a first direction;
the plurality of second electrode blocks of the respective second touch electrode and a respective second touch signal line of the plurality of second touch signal lines are parts of a second unitary structure;
the plurality of first touch signal lines and the plurality of second touch electrodes are in a same layer;
the plurality of second touch signal lines, the plurality of first touch signal lines, and the second touch electrode layer are in a same layer; and
the first unitary structure and the second unitary structure are in a same layer.

2. The touch substrate of claim 1, wherein the plurality of vias are in the touch sensing area;
the plurality of first touch signal lines are respectively connected to the plurality of first touch electrodes respectively through the plurality of vias in the touch sensing area; and
the respective first touch signal line continuously extends, in a same layer, from a respective via of the plurality of vias into the peripheral area.

3. The touch substrate of claim 1,
wherein at least 90% of the orthographic projection of the respective one of the plurality of first electrode blocks of the respective one of the plurality of first touch electrodes on the insulating layer overlaps with the orthographic projection of the first touch signal line block on the insulating layer.

4. The touch substrate of claim 1, wherein the plurality of first touch signal lines and the plurality of second touch signal lines are alternately arranged in at least a portion of the peripheral area;
at least one first touch signal line of the plurality of first touch signal lines is between two adjacent second touch signal lines of the plurality of second touch signal lines; and
at least one second touch signal line of the plurality of second touch signal lines is between two adjacent first touch signal lines of the plurality of first touch signal lines.

5. The touch substrate of claim 1, wherein the plurality of first touch signal lines extend across the touch sensing area respectively by different lengths;
at least one of the plurality of first touch signal lines crosses over multiple rows of first touch electrodes of the plurality of first touch electrodes; and
at least two of plurality of first touch signal lines cross over different numbers of rows of first touch electrodes.

6. The touch substrate of claim 1, wherein the plurality of first touch electrodes are arranged successively along the first direction, each of the plurality of first touch electrodes extending substantially along the second direction different from the first direction; and
the plurality of second touch electrodes are arranged successively along the second direction, each of the plurality of second touch electrodes extending substantially along the first direction.

7. The touch substrate of claim 6, wherein portions of the plurality of first touch signal lines in the touch sensing area are substantially parallel to the first direction.

8. The touch substrate of claim 6, wherein the plurality of first touch signal lines are absent in a region corresponding to a boundary of the touch sensing area extending along the first direction.

9. The touch substrate of claim 1, wherein the orthographic projection of the first touch signal line block on the insulating layer completely covers the orthographic projection of the respective one of the plurality of first electrode blocks of the respective one of the plurality of first touch electrodes on the insulating layer.

10. The touch substrate of claim 1, wherein the plurality of first touch electrodes are a plurality of first mesh electrodes;
the plurality of second touch electrodes are a plurality of second mesh electrodes; and
the first touch signal line block is a mesh electrode block.

11. The touch substrate of claim 1, further comprising a plurality of first dummy patterns and a plurality of second dummy patterns;
wherein the plurality of first dummy patterns and the plurality of first touch electrodes are in a same layer; and
the plurality of second dummy patterns and the plurality of second touch electrodes are in a same layer.

12. The touch substrate of claim 11, wherein at least one of the plurality of first touch signal lines extends along a path having at least one of the plurality of second dummy patterns on a first side and at least one of the plurality of second dummy patterns on a second side.

13. The touch substrate of claim 12, wherein the plurality of second touch electrodes are arranged successively along the second direction, each of the plurality of second touch electrodes extending substantially along the first direction different from the second direction;
on the first side of the at least one of the plurality of first touch signal lines, multiple ones of the plurality of second dummy patterns and multiple ones of the plurality of second electrode blocks are alternately arranged; and
on the second side of the at least one of the plurality of first touch signal lines, multiple ones of the plurality of second dummy patterns and multiple ones of the plurality of second electrode blocks are alternately arranged.

14. The touch substrate of claim 1, wherein the peripheral area is an area abutting only one side of the touch sensing area.

15. A touch control display apparatus comprising the touch substrate of claim 1; and
a touch control integrated circuit.

16. The touch control display apparatus of claim 15, wherein the touch control display apparatus has a display area corresponding to the touch sensing area, the touch control display apparatus configured to display image in the display area; and
the plurality of first touch signal lines extend across at least a portion of the display area into the peripheral area.

17. The touch control display apparatus of claim 16, wherein the plurality of vias are in the display area; and
the plurality of first touch signal lines are respectively connected to the plurality of first touch electrodes respectively through the plurality of vias in the display area.

18. The touch control display apparatus of claim 16, wherein the plurality of first touch signal lines extend across the display area respectively by different lengths.

19. The touch control display apparatus of claim 15, further comprising a black matrix in a region corresponding to the peripheral area of the touch substrate;
wherein the plurality of first touch electrodes are arranged successively along the first direction, each of the plurality of first touch electrodes extending substantially along the second direction;
the plurality of second touch electrodes are arranged successively along the second direction, each of the plurality of second touch electrodes extending substantially along the first direction; and
the black matrix is absent in a region corresponding to at least a portion of a boundary of the touch sensing area extending along the first direction.

20. A method of fabricating a touch substrate having a touch sensing area, and a peripheral area for bonding circuit parts, comprising: forming a first touch electrode layer comprising a plurality of first touch electrodes; forming a second touch electrode layer comprising a plurality of second touch electrodes; forming an insulating layer, the insulating layer formed between the first touch electrode layer and the second touch electrode layer for insulating the first touch electrode layer from the second touch electrode layer; forming a plurality of vias extending through the insulating layer; and forming a plurality of first touch signal lines extending across at least a portion of the touch sensing area into the peripheral area; forming a plurality of second touch signal lines respectively connected to the plurality of second touch electrodes; wherein the plurality of first touch signal lines are respectively connected to the plurality of first touch electrodes respectively through the plurality of vias; a respective one of the plurality of first touch electrodes comprises a plurality of first electrode blocks electrically connected substantially along a second direction; a respective first touch signal line of the plurality of first touch signal lines comprises a first touch signal line block; at least 80% of an orthographic projection of one of the plurality of first electrode blocks of a respective one of the plurality of first touch electrodes on the insulating layer overlaps with an orthographic projection of the first touch signal line block on the insulating layer; and the first touch signal line block is connected to the one of the plurality of first electrode blocks of the respective one of the plurality of first touch electrodes through one or multiple ones of the plurality of vias extending through the insulating layer; the respective first touch signal line of the plurality of first touch signal lines, including the first touch signal line block, is part of a first unitary structure; a respective second touch electrode of the plurality of second touch electrodes comprises a plurality of second electrode blocks electrically connected substantially along a first direction; the plurality of second electrode blocks of the respective second touch electrode and a respective second touch signal line of the plurality of second touch signal lines are parts of a second unitary structure; the plurality of first touch signal lines and the plurality of second touch electrodes are formed in a same layer, the plurality of second touch signal lines, the plurality of first touch signal lines, and the second touch electrode layer are in a same layer; and the first unitary structure and the second unitary structure are in a same layer.

* * * * *